EQUIVALENT FOUR-WIRE REPEATERS

Filed Dec. 28, 1956 3 Sheets-Sheet 1

LOW PASS FILTER

INVERSE LOW PASS FILTER

INVENTOR
T. L. MAIONE
BY W. L. Keefauver
ATTORNEY

INVENTOR
T. L. MAIONE
BY W. L. Keefauver
ATTORNEY

Feb. 24, 1959 T. L. MAIONE 2,875,283

EQUIVALENT FOUR-WIRE REPEATERS

Filed Dec. 28, 1956 3 Sheets-Sheet 3

ANTIMETRIC FILTER

INVENTOR
T. L. MAIONE
BY W. L. Keefauver
ATTORNEY

United States Patent Office 2,875,283 Patented Feb. 24, 1959

2,875,283

EQUIVALENT FOUR-WIRE REPEATERS

Theodore L. Maione, Shrewsbury, N. J., assignor to Bell Telephone Laboratories, Incorporated, New York, N. Y., a corporation of New York Application December 28, 1956, Serial No. 631,148

20 Claims. (Cl. 179—170)

This invention relates to repeaters for two-way communication systems and, more particularly, to equivalent four-wire repeaters having improved impedance matching characteristics and lower theoretical losses.

In a carrier signal transmission system, it is frequently desirable to transmit signals in both directions over a single pair of conductors. Such a system is termed an equivalent four-wire transmission system because bilateral transmission, usually requiring four separate wires, is accomplished with only two wires. Equivalent four-wire systems are particularly desirable in long transmission systems where the apparatus is relatively inaccessible, for example, a submarine cable system. Since an equivalent four-wire system provides two-way communication with only half as much cable as a physical four-wire system, the probability of loss of communication through cable failure is only half as great. By the same reasoning, it is more desirable to provide only one amplifier in a repeater for both directions of transmission to avoid the higher incidence of failure inherent in the more complex configuration. Furthermore, if the growth rate of such a system is low, additional circuits may be added most economically with the equivalent four-wire system.

A repeater commonly used for equivalent four-wire systems is the so-called 21-type repeater which, in its simplest form, includes high-pass and low-pass filters connected between the input side of the unilateral amplifier and the respective two-wire lines, and similar high-pass and low-pass filters connected between the output side of the amplifier and the opposite ones of the respective two-wire lines. In a system using such a repeater, different frequency bands are used for the two directions of transmission and, in the repeater, carrier signals traveling in one direction are routed through the unilateral amplifier by way of the high pass filters, while those traveling in the opposite direction are routed by way of the low pass filters.

Unfortunately, a 21-type repeater such as that described includes a pair of inherent feedback paths outside of the unilateral amplifier. Each of these feedback paths includes a high-pass and low-pass directional filter connected in series between the input and output sides of the amplifier. In a long transmission system these feedback paths impose relatively severse discrimination requirements on the filters. In the first place, the filters must introduce a sufficient amount of loss outside of their pass bands to provide a satisfactory margin against singing. Since feedback tends to alter the gain of the amplifier, however, even more important is the requirement that the filter losses outside of their pass bands be high enough so that the deviation or misalignment of the entire system is kept within reasonable limits. This second requirement is particularly severe in long submarine cable systems since not only is the number of repeaters relatively large, but there is also little chance to equalize their misalignments at regular intervals. Since filters with high discrimination between frequencies within and without their nominal pass band tend to be complex and in a number of respects less reliable than simpler filters, any relatively simple way of relaxing such discrimination requirements without at the same time sacrificing repeater performance would be highly advantageous.

In the past, the usual approach to the problem has been to use hybrid connections at the junctions between the directional filters and the two-wire lines. The balance obtained in this manner serves to reduce the filter discrimination requirements to acceptable levels. At the same time, however, a flat loss of about three decibels is added for each hybrid used, reducing the gain available for distortion-reducing amplifier feedback, decreasing the required repeater spacing in a long system, and aggravating misalignment problems. In addition, the use of hybrids adversely affects the impedance match between the 21-type repeater and the two-wire transmission lines to which it is connected. Thus, at each end of the repeater the impedance of one filter in its pass band approximates a pure resistance and the impedance of the other filter outside its pass band approximates a pure reactance. The impedance presented by the hybrid therefore cannot match a cable which has an impedance approximating a pure resistance at carrier frequencies.

The impedance matching problem has been overcome to some extent by utilizing mutually inverse filters with like pass bands in the hybrid arms. The inverse filters are so related to one another that at any frequency outside their common pass band the impedance presented by one of the filters is substantially equal to the inverse of the impedance of the other filter at the same frequency, and both filters present the same resistance within their common pass band. Structurally, inverse filters are filters in which each series arm capacitor in one filter is replaced by a shunt arm inductor in the other; each series arm inductor in one filter is replaced by a shunt arm capacitor in the other; each series arm combination of an inductor and a capacitor in series in one filter is replaced by a shunt arm combination of a capacitor and an inductor in parallel in the other filter; and so forth. While this arrangement has improved the impedance matching characteristics of the repeater with respect to the transmission lines, it has resulted in a connection within the repeater which makes impedance matching of the amplifier more difficult and, furthermore, retains the flat transhybrid loss. An example of such an arrangement is shown in the copending application of F. J. Braga, Serial No. 553,388, filed December 15, 1955, assigned to applicant's assignee.

A principal object of the present invention therefore is to reduce the filter discrimination requirements in an equivalent four-wire repeater and at the same time improve the impedance matching characteristics with respect to the unilateral amplifier.

It is another object of the invention to improve the impedance match between a repeater and the two-wire lines to which it is connected by means of hybrids without incurring the flat loss penalty normally occasioned by the use of hybrids.

It is yet another object of the invention to at least partially compensate for the undesired feedback loops around the amplifier with no added complexity in the filter structures.

In attaining these objects, use is made of the so-called Bobis type eight-terminal filter disclosed in S. Bobis Patent 2,044,047 issued June 16, 1936. At microwave frequencies this circuit has also been referred to as a hybrid frequency branching circuit and is disclosed in this aspect in W. D. Lewis Patent 2,561,212 issued July 17, 1951. This circuit, shown in schematic form in Fig. 1, in general comprises two hybrid means each having two pairs of mutually conjugate transmission paths. Connected between respective single paths of one of these pairs in each hybrid means are two filters having the same pass band but providing mutually inverse characteristics outside of this common pass band. The remaining four transmission paths or ports represent the external terminals of the network. At microwave frequencies, the filters are structurally identical but one of them is spaced a quarter wavelength farther away from one of the hybrid means than the other. At lower frequencies these filters are of the inverse type as described above. The properties of this network are such that a signal introduced at any one of the ports will be delivered to a second port if it is within the pass band of the filters, but will be delivered to a third port if it is not within the pass band of the filters. Furthermore, each of the ports presents a fixed resistance for all frequencies provided the remainder of the ports are themselves properly terminated by resistances. The exact operation of this circuit will hereinafter be more fully described.

In accordance with the present invention, at least two frequency branching networks of the type described above are used, each one of two ports of one network being connected to respective ones of two ports of the other network. A unilateral amplifier is connected between one of the remaining two ports of the first network and one of the remaining two ports of the second network. The single port remaining on each of the networks is connected to a respective one of the transmission lines. These connections are made such that a signal delivered by one of the transmission lines, which is within the pass band of the filters, is routed through the amplifier in the same direction as a signal outside of the pass band of the filters delivered by the other transmission line. It will be noted that all the ports of both networks are or easily can be resistively terminated, either by corresponding ports of the other network, by the unilateral amplifier, or by the transmission lines. Therefore, not only can all of the filters be designed with identical pass bands, but the amplifier and the transmission lines can also be designed to have the same resistive input and output impedances. The filter discrimination requirements, the impedance matching characteristics of the components and the inherent feedback circuits can, therefore, all be improved without incurring any flat gain loss.

From one point of view, the present invention provides all of the advantages of the use of hybrids to asist the band splitting filters in a 21-type repeater without any of its disadvantages. Each branching network of the type featured provides a balance similar to that provided by the conventional hybrid connection, thus permitting relaxation of filter discrimination requirements. At the same time, however, each network feeds the whole of its output to the unilateral amplifier, thus avoiding the flat loss introduced by certain arrangements found in the prior art. The relaxed filter discrimination requirements afforded by the invention permit the use of somewhat simpler filter structures which are, in turn, more reliable than more complex structures because there are fewer elements in which failures can occur. The possibility of misalignments caused by variations in elements due to temperature changes and aging is reduced in the same way. In addition, design requirements on the amplifier are made less strict because it is connected between constant resistance terminations. Finally, the avoidance of trans-hybrid loss by the invention results in a retention of full amplifier gain to provide both distortion-reducing feedback within each repeater and the maximum possible repeater spacing.

These and other objects and features, the nature of the present invention and its various advantages, will appear more fully upon consideration of the specific illustrative embodiments of the invention shown in the accompanying drawings and described in the following detailed explanation of these drawings.

Figure 1:
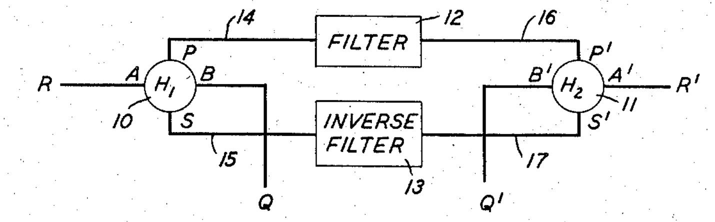
Fig. 1 is a schematic representation of a four-port or eight-terminal constant resistance frequency branching network of the type employed by the invention.

A basic hybrid branching circuit is shown in Fig. 1. The general function of such a unit is to segregate or branch signal components in a particular chosen frequency band from the signal components outside of that band. The branching circuit comprises a pair of hybrid means 10 and 11 each having two pairs of conjugately related arms A, B and P, S. Hybrid means 10 is arranged with the arms P and S connected to transmission lines 14 and 15, respectively, which are in turn connected to one end of filters 12 and 13. Filters 12 and 13 are designed to have identical pass bands and to reflect all frequencies not within the common pass band. Furthermore, the reflections provided by filters 12 and 13 are mutually inverse, that is, are substantially 180 degrees out of phase with respect to each other. Hybrid means 11 is arranged with arms P′ and S′ connected to transmission lines 16 and 17, respectively, which are in turn connected to the other end of filters 12 and 13.

Hybrid means 10 and 11 may be designed for operation at low frequencies comprising in this case hybrid coils, or may be designed for microwave frequencies in which case they may comprise structures of a so-called wave guide junction or wave guide coaxial, or other transmission line loop structures. Whatever form of hybrid structure is employed, it should have four arms or branches associated in two pairs, each arm of a pair being conjugately related to the other arm of the same pair. For convenience here, a notation will be used in which the first pair of arms, or branches, will be designated A and B, respectively, and arms of the second pair will be designated P and S, respectively. The inherent properties of hybrid means are well known by which wave energy introduced into the hybrid from or by way of either arm of the first pair will produce no energy leaving the hybrid by way of the other arm of that pair, but the energy introduced will divide equally between the other pair of arms of the hybrid means. Furthermore, the signals representing the halves of the energy in each of the second pair of arms will be in phase if the energy is introduced by one arm A of the first pair, or 180 degrees out of phase if it is introduced by way of the other arm B of the first pair. Conversely, if equal wave energies are introduced in phase into the hybrid means by way of the two arms P and S of the second pair, they will combine in arm A of the first pair, no wave energy being transmitted to arm B. If equal wave energies 180 degrees out of phase are introduced into the hybrid means by way of the two arms P and S of the second pair, the wave energies will combine in arm B of the first pair, no wave energy being transmitted to arm A. As applied to the circuit of Fig. 1, this means that the wave energy entering arm A of hybrid means 10 by transmission line R will divide equally at all frequencies between transmission lines 14 and 15, the two portions leaving hybrid arms P and S being in phase with respect to each other.

If a signal including frequency components within the pass band of filters 12 and 13 is applied to transmission line R, this signal will divide equally between arms P and S. The components of the signal travel along lines 14 and 15 to the filters 12 and 13. At the filters, the frequency components within the pass band of the filters will pass therethrough to transmission lines 16 and 17, respectively. However, frequency components outside of the pass band of filters 12 and 13 will be reflected back down lines 14 and 15 and returned to hybrid means 10 by way of arms P and S. The reflected signals in these two arms will be 180 degrees out of phase with respect to their original phase relation when first leaving hybrid means 10, since one of the properties of filters 12 and 13 is to provide these mutually conjugate reflections. From the inherent properties of the hybrid means, it is apparent that the reflected waves will not appear in input transmission line R but will combine in arm B of hybrid means 10 and will appear in transmission line Q.

The half energy portions of the signal having frequency components within the pass band of filters 12 and 13 will pass freely therethrough to transmission lines 16 and 17, respectively, and thence to the second hybrid means 11. These two components of energy will arrive at hybrid means 11 at arms P′ and S′ without a change in their relative phase relations since filters 12 and 13 present identical pass band characteristics. They will combine in hybrid means 11 and pass out arm A′ to which transmission line R′ is connected.

Similarly, if a signal comprising a plurality of frequency components is applied through transmission line Q to arm B of hybrid means 10, components within the pass band of filters 12 and 13 will pass therethrough to hybrid means 11 and combine in arm B′ appearing in line Q′, while frequency components outside of the pass band of filters 12 and 13 will be reflected and combine in arm A of hybrid means 10, appearing in line R.

Since the schematic diagram of the frequency branching network is symmetrical, the general properties of the circuit may be briefly summarized in view of the above-described operation. Therefore, let each of the lines connected to the four arms R, Q, R′ and Q′ of the circuit be terminated in a characteristic impedance looking away from the network. Under these conditions this characteristic impedance will be seen looking toward the network from any one of the lines. When a signal having frequency components outside of the pass band of the filters and frequency components within the pass band of the filters is applied to the branching network by means of any line or lines, line R will be effectively connected to line R′ and line Q to line Q′ for the frequency components within the pass band of the filters. Line R will be effectively connected to line Q and line R′ to line Q′ for all frequency components outside of the pass band of the filters. Line R will always be balanced from or conjugate to line Q′ and line R′ from line Q.

Numerous physical embodiments of both low frequency and high frequency microwave components may be designed having required characteristics. For example, at low frequency, the hybrid means may comprise hybrid coils of the type well known to those skilled in the art such as, for example, a transformer with a center-tapped primary winding, and the filters may comprise those of the inverse type to be more fully described below. At high frequencies within the microwave range, the hybrid means may comprise magic-T wave guide junctions and the filters may be structurally identical combinations of posts, screws and irises, one filter being displaced from the hybrid junctions a quarter wave length of the reflected frequency components farther than the other one. These microwave components are more fully described in W. D. Lewis Patent 2,561,212 issued July 17, 1951 and in the references therein cited.

In each of the following embodiments to be described, a plurality of such hybrid branching networks are combined in various configurations in order to accomplish the objects of the invention. Specifically, they are utilized to separate or branch signals at two different frequencies, each of which is used for a different direction of transmission in a carrier wave transmission system. This branching is necessary in order to route signals coming from opposite directions in the same direction through a unilateral amplifier.

Figure 2:
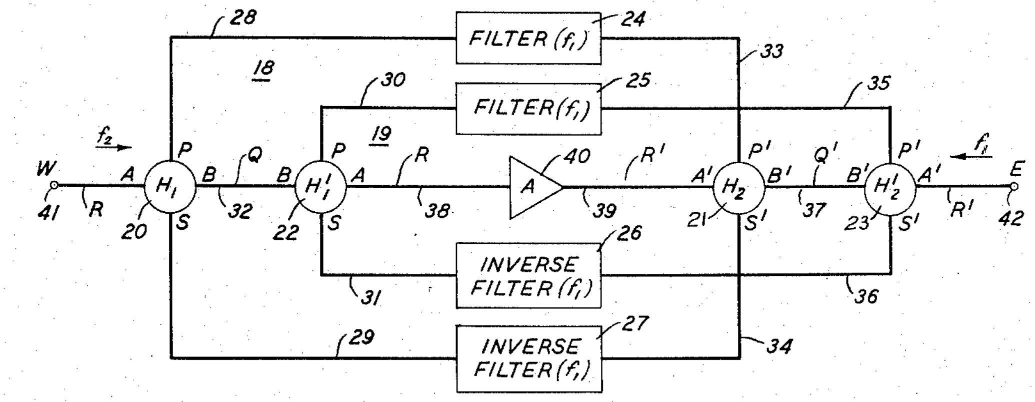
Fig. 2 is a schematic representation of a repeater in accordance with the principles of the invention showing the manner in which two networks such as that shown in Fig. 1 are connected together.

Consider therefore Fig. 2 which shows a repeater suitable for use in a two-way transmission system operating with two frequency-spaced channels, one for each direction of transmission. The center frequency of one channel is frequency spaced from the other channel by at least the band width of each channel. In many cases it will be desirable to leave some margin of separation between these channels, in which case the frequency spacing between the center frequencies will be somewhat greater than the band width of each channel. The intelligence bearing signal to be amplified and transmitted in each direction comprises a band of signal side bands produced by modulating a carrier signal of frequency approximating the mid-band frequency of the channel with the intelligence signal by any of the well known methods of modulation. The intelligence bearing signals may or may not include the carrier frequency depending on the particular type of modulation employed. In any event, it will be convenient in the following discussion to designate the intelligence bearing signals for each direction by the frequency of the mid-band component or carrier frequency. That is, the signal transmitted from W to E, or left to right, may be called signal component $f_2$ and the signal transmitted from E to W, or right to left, may be called signal component $f_1$.

It should be remembered, however, that these "channels" may comprise a large group of actual communications channels capable, for example, of carrying hundreds of telephone conversations in each direction.

The repeater comprises two hybrid frequency branching networks 18 and 19. Networks 18 and 19 are identical to that shown in Fig. 1. Network 18 comprises two hybrid means 20 and 21 each having two pairs of mutually conjugate arms A, B and P, S in hybrid means 20 and A′, B′ and P′, S′ in hybrid means 21. Connected between each one of one pair of arms of hybrid means 20 and 21, respectively, that is, between arms P and P′ and between arms S and S′, are filters 24 and 27. Filter 27 has the identically same pass band as filter 24 which pass band includes frequency $f_1$, but provides a reflection outside of this pass band which is conjugate to the reflection provided by filter 24 outside of the common pass band. Similarly, network 19 comprises two hybrid means 22 and 23, two arms of each of which are separated by mutually inverse filters 25 and 26. Branching networks 18 and 19 have all of the properties described with respect to the branching network of Fig. 1 and are connected together by their common transmission line Q and Q′ shown at 32 and 37. Transmission line R of network 18 provides the West input and output terminal 41 while transmission line R′ of branching network 19 provides the East input and output terminal 42. A unilateral amplifier 40 is connected between branching networks 18 and 19 by way of transmission line R of branching network 19 shown at 38, and transmission line R′ of branching network 18, shown at 39. Amplifier 40 amplifies only those signals delivered by transmission line R of branching network 19 and traveling in the direction toward transmission line R′ of branching network 18. Amplifier 40 may be of any well known design but is preferably of the negative feedback type providing high gain stability.

The exact operation of the repeater shown in Fig. 2 may be more readily understood by tracing the paths of the signals through the repeater. For this purpose, signal energy traveling from right to left is designated as $f_1$ and signal energy traveling from left to right is designated as $f_2$. Signal $f_1$ is within the pass band of filters 24, 25, 26 and 27 while signal $f_2$ is outside of this common pass band.

Signal $f_1$ arrives at hybrid means 23 by way of transmission line R′ and splits equally between lines 35 and 36 with the portions in phase with respect to each other. These equal portions travel to filters 25 and 26 and pass therethrough because they are within their pass band. Continuing on through lines 30 and 31 these equal portions arrive at hybrid means 22 and combine in transmission line R since they are in phase. They are there introduced into amplifier 40 where they are given sufficient amplification to carry them to the next repeater station without excessive degradation of the signal content. They then pass to transmission line 39 and to hybrid means 21 where the amplified signals again split into two equal portions in lines 33 and 34. The amplified portions pass through filters 24 and 27 into lines 28 and 29. They are introduced into hybrid means 20 where they combine together in transmission line 41 and pass out to the West transmission line section of the transmission system. It can be seen that unamplified signals arriving at the East end of the repeater are amplified, transverse the repeater to the West end and pass on toward the next repeater station.

Signals traveling in the other direction from left to right and represented by $f_2$ are introduced by transmission line 41 into hybrid means 20. These signals split into equal in-phase portions in lines 28 and 29 and travel to filters 24 and 27. Since these signals are not within the pass bands of these filters, they are reflected and, furthermore, due to the nature of the filters, are reflected 180 degrees out of phase with respect to each other. Therefore, upon arrival back at hybrid means 20, they combine in transmission line 32 rather than line 41. In hybrid means 22, they again split in lines 30 and 31, are reflected by filters 25 and 26 and recombine in line 38. The signals are now amplified in amplifier 40 and introduced into hybrid means 21. The amplified signal splits into two equal portions in lines 33 and 34, is reflected by filters 24 and 27 and recombines in line 37. In hybrid means 23, the signal splits in lines 35 and 36, is reflected by filters 25 and 26 and recombines in line 42 where it is passed on to the next repeater station in the East direction.

It can be seen from the above that high and low level signals at the same frequency are not present at the same place in the repeater. Furthermore, each of the four terminals of the frequency branching networks are terminated by constant resistances at all frequencies. Terminals R of network 18 and R′ of network 19 are connected to transmission lines which are normally designed to present resistances at the carrier frequencies. Terminals Q and Q′ of both networks are connected to each other. Terminals R of network 19 and terminal R′ of network 18 are connected to the unilateral amplifier which may easily be designed to have constant resistance input and output impedances. With this arrangement, all filters are balanced and the filter discrimination requirements are thereby lessened. All connections are made between constant resistances which may be designed to be the same resistances for all frequencies. Furthermore, no trans-hybrid loss is taken at any of the hybrid means so that the entire gain of the amplifier is available for distortion-reducing feedback within the repeater and for raising the output of the repeater to maximum level.

Figure 3A:
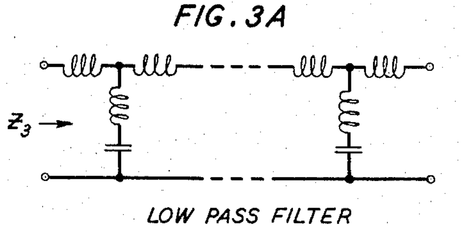
Figs. 3A and 3B show mutually inverse filter circuits for use in embodiments of the present invention.
Figure 3B:
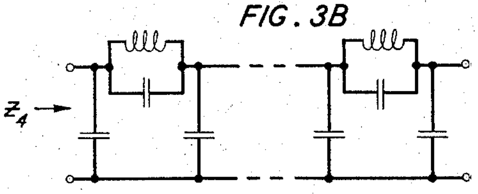

A pair of inverse low pass filter circuits suitable for use as filters 24, 25, 26 and 27 in the repeater circuit in Fig. 2 for low frequency applications are illustrated in Figs. 3A and 3B, respectively. As shown, each series arm inductance in the filter shown in Fig. 3A corresponds to a shunt arm capacitor in the inverse filter shown in Fig. 3B, while each shunt arm combination of inductance and capacitance in series in the filter shown in Fig. 3A corresponds to a series arm combination of inductance and capacitance in shunt in the inverse filter shown in Fig. 3B. Both filters have substantially the same cut-off frequency $f_c$. While low pass inverse filters are shown, it is obvious that high pass or band pass inverse filters could be just as easily designed.

Figure 4:
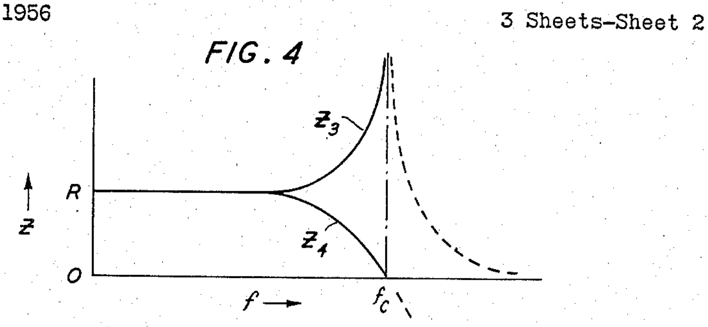
Fig. 4 is a graphical and qualitative representation of the manner in which the impedances of the filter circuits shown in Figs. 3A and 3B vary with frequency.

Impedance versus frequency curves for the inverse low pass filters of Figs. 3A and 3B are shown in Fig. 4 where the upper curve represents $Z_3$, the impedance presented by the filter of Fig. 3A, and the lower curve represents $Z_4$, the impedance presented by the filter shown in Fig. 3B. Both filters present an impedance which is resistive (solid line) for their pass bands (at frequencies below $f_c$) and an impedance which is reactive (dashed line) in their stop bands (frequencies above $f_c$). The filters are designed such that the impedance presented by one filter $Z_3$ is substantially equal to $$\frac{R^2}{Z_4}$$

where $Z_4$ is the impedance presented at the same frequency by the other filter and R is the mid-band resistance presented by both filters within their common pass band.

Figure 5:
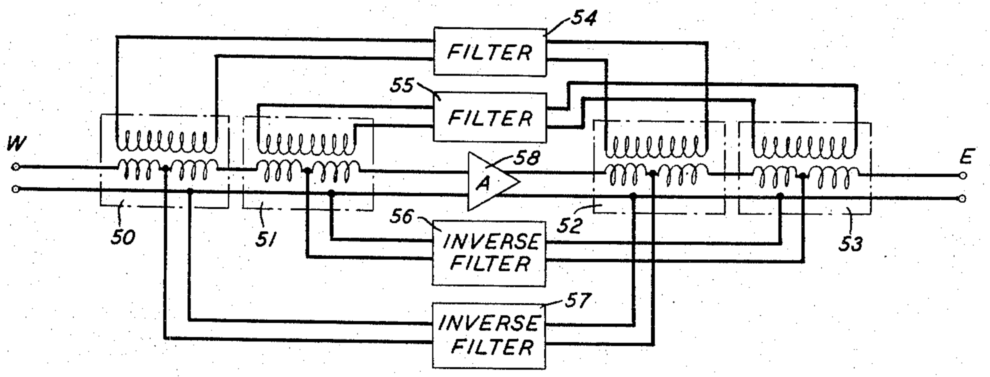
Fig. 5 shows a complete 21-type equivalent four-wire repeater embodying the principles of the invention.

In Fig. 5 is shown a more specific embodiment of the invention for use at low frequencies. The repeater of Fig. 5 comprises four hybrid coils 50, 51, 52 and 53 with a bridged-T connection. That is, each hybrid coil comprises a transformer having two windings, the primary winding being symmetrically split. The center tap of the primary winding represents one arm of the hybrid coil, the outer two terminals of the primary winding represents two more of the hybrid terminals, and the secondary winding represents the fourth hybrid terminal. The two outer terminals of the primary represent one pair of conjugate arms while the center tap and the secondary winding represent the other pair of conjugate arms. Filter 54 and inverse filter 57 are connected between hybrid coils 50 and 52 in the same manner as filters 24 and 27 are connected between hybrid means 20 and 21 in Fig. 2, that is, between each arm of one conjugate pair on each hybrid. Similarly, filter 55 and inverse filter 56 are connected between two arms of hybrid coil 51 and hybrid coil 53. An amplifier 58 is connected between hybrid coil 51 and hybrid coil 52. Filters 54 and 55 and inverse filters 56 and 57 may be, for example, of the type shown in Figs. 3A and 3B, respectively, or may be mutually inverse high pass filters, or may be mutually inverse band pass filters.

The repeater configuration shown in Fig. 5 operates in all respects in the same manner as described with respect to Fig. 2. That is, a signal entering the repeater from the left, or West, end is split in hybrid coil 50, the halves traveling to filters 54 and 57. Since these components are not within the pass band of these filters, they are reflected back to hybrid coil 50 where they combine in the right hand coil and pass to hybrid coil 51. Here the same process is again repeated, the reflected components combining in the right hand coil and passing on to amplifier 58. At amplifier 58 this signal is amplified and passed on to hybrid coil 52. The signal splits in hybrid coil 52, half passing to filter 54 and the other half passing to inverse filter 57. The amplified portions are reflected from these filters back to hybrid coil 52 where they combine in the right hand coil to pass on to hybrid coil 53. Here they again split, are reflected by filter 55 and inverse filter 56 and re-combine in the right hand coil of hybrid coil 53, passing out the right, or East, end of the repeater.

Figure 6:
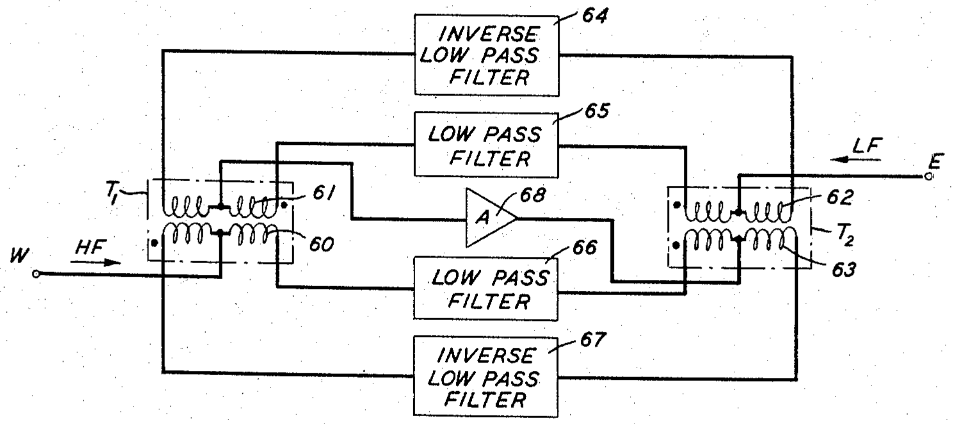
Fig. 6 shows a simplified repeater embodying the principles of the invention.

In Fig. 6 is shown a repeater configuration embodying the principles of the invention and having all of the advantages disclosed with respect to Figs. 2 and 5 and, furthermore, arranged in a more advantageous manner. The repeater shown in Fig. 6 comprises two transformers $T_1$ and $T_2$, each having an identical primary and secondary winding. Each of these windings are symmetrically split by a center tap to which external connections are made. It can be seen that each of transformers $T_1$ and $T_2$ comprises in effect a pair of hybrid coils such as coils 50 and 51 in Fig. 5. Instead of a conductor connecting the two hybrid coils, they are coupled by the mutual inductance within the transformer cores. Since no external connections need be made to connect these arms of the hybrid coils, this transformer coupling operates just as effectively as the direct coupling used in Fig. 5, and, furthermore, permits the use of a much simpler structure to perform the splitting and combining functions. Primary winding 60 of transformer $T_1$ has its center tap connected to the West, or left terminal of the repeater. The outer two terminals of primary winding 60 are connected to low pass filter 66 and inverse low pass filter 67, respectively. The secondary winding of transformer $T_1$ has its center tap connected to unilateral amplifier 68 and has the outer terminals connected to low pass filter 65 and inverse low pass filter 64, respectively. Transformer $T_2$ has a primary winding 62, the center tap of which is connected to the right hand, or East, terminal of the repeater. The outer terminals of winding 62 are connected to the other ends of filter 65 and inverse filter 64, respectively. Secondary winding 63 of transformer $T_2$ is connected to the output of amplifier 68 and the outer terminals of winding 63 are connected to filter 66 and inverse filter 67, respectively. The operation of the repeater shown in Fig. 6 may be better understood by tracing the path of the signals therethrough.

A high frequency signal entering the repeater from the left, or West, end thereof is split equally in primary winding 60 of transformer $T_1$ between the two halves of the windings. Since these signals have opposite polarities, their fields tend to cancel each other and no net field is set up in the core of transformer $T_1$. The components pass on to filter 66 and inverse filter 67. Since these high frequency components are not within the pass band of these filters, they are reflected therefrom and, furthermore, are reflected 180 degrees out of phase with respect to each other. Upon returning to primary winding 60, these portions no longer create fields which oppose each other and therefore set up a net field in the core of transformer $T_1$ and pass on to secondary winding 61. The signal again splits in winding 61 between the two halves and the portions pass on to filter 65 and inverse filter 64. Here they are again reflected 180 degrees out of phase and return to winding 61. Since the signals now oppose each other, no field is set up in the core of transformer $T_1$ and the portions combine at the center tap and pass on to amplifier 68. After being amplified by amplifier 68, signals pass on to the secondary winding 63 of transformer $T_2$. The signal again splits, is reflected with a phase reversal from filter 66 and inverse filter 67, returns to transformer $T_2$ and passes to primary winding 62. The signal again splits, is reflected as above and combines at the center tap to pass out the right hand, or East, end of the repeater.

Similarly, low frequency signals entering the repeater at the right hand, or East, terminal are split in primary winding 62 of transformer $T_2$, are passed through filters 64 and 65 without a phase reversal, combine in secondary winding 61 of transformer $T_1$ and pass on to amplifier 68. After being amplified, the signal is split in secondary winding 63 of transformer $T_2$, passes through filters 66 and 67, combines in primary winding 60 of transformer $T_1$ and leaves the repeater by the left, or West, terminal.

It can be seen that the arrangement shown in Fig. 6 presents a constant R impedance to all of the filters, to the unilateral amplifier, and to the transmission line sections connected to the repeater. Furthermore, there are no high level and low level signals in the same hybrid coil core; there is no three decibel loss in any of the hybrids; and the filter discrimination requirements are less stringent due to the balances within the circuit.

It can be seen from inspection that there are two spurious feedback loops around amplifier 68 in Fig. 6; one by way of filters 66 and 67 and transformer $T_1$ and the other by way of filters 64 and 65 and transformer $T_2$. These feedback paths, however, are identical and can be used to cancel each other by introducing a 180 degree phase reversal between them. Thus, secondary winding 61 of transformer $T_1$ is wound in the opposite sense as primary winding 60 while secondary winding 63 of transformer $T_2$ is wound in the same sense as primary winding 62. The effects of this phase reversal are more clearly described in the copending application of S. W. Autrey, Serial No. 539,082, filed October 7, 1955, and assigned to applicant's assignee. Transmission in these feedback loops can be shown to involve two different effects, first, the difference between the transmissions of a filter and its inverse and, secondly, the difference between the reflection coefficients of the filter and its inverse. At low frequencies the loop loss is obtained by balance only since all of the filters are transparent in this band. This sets requirements on the similarly of the filters and the magnitude of the return loss in their pass bands. At high frequencies, however, the loop loss is obtained only through the difference in stop band attenuations of the filter and its inverse. Since the filters may more readily be designed to produce moderate loss in their stop bands, the similarity requirements are somewhat less for high frequencies. The fact that loop loss at low frequencies can be obtained only by balance is a serious disadvantage which may be difficult to overcome. Another configuration utilizing filter discrimination to obtain loop loss at all frequencies is shown in Fig. 7.

Figure 7:
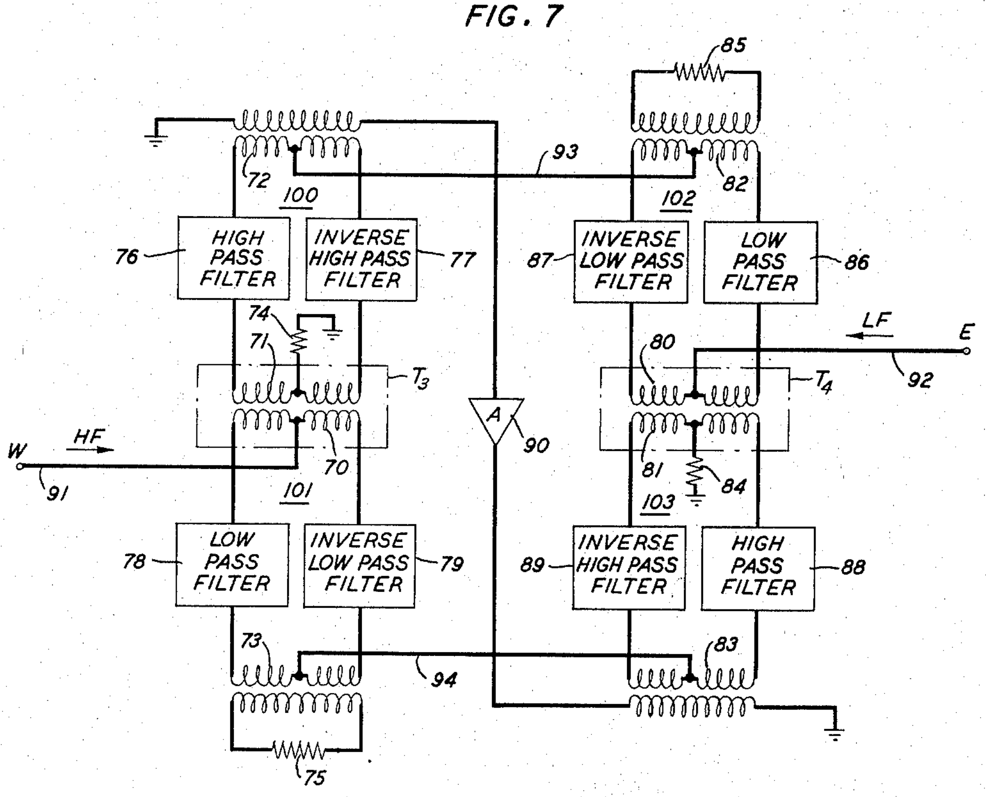
Fig. 7 illustrates an alternative embodiment of the invention which utilizes four constant resistance networks as shown in Fig. 1 to further improve the filter discrimination requirements of the repeater.

In Fig. 7 is shown a repeater configuration in accordance with the principles of the invention providing both high pass and low pass filters in each feedback loop. This repeater comprises four frequency branching networks 100 through 103 identical to the one shown schematically in Fig. 1. Each of these networks includes two hybrid coils and two mutually inverse filters. For example, branching network 100 comprises hybrid coil 71 and hybrid coil 72, two arms of each of which are separated by high pass filter 76 and inverse high pass filter 77, respectively. Branching network 100 is connected to branching network 102 by means of conductor 93. Network 100 is also coupled to network 101 through transformer $T_3$. Similarly, network 103 is connected to network 101 by means of conductor 94 and coupled to network 102 through transformer $T_4$. Networks 100 and 103 include mutually inverse high pass filters 76, 77 and 88, 89. Branching networks 101 and 102 include mutually inverse low pass filters 78, 79 and 86, 87. A unilateral amplifier 90 is connected between the secondary winding of hybrid coil 72 in network 100 and the secondary winding of hybrid coil 83 in network 103. The secondary windings of hybrid coils 73 in network 101 and secondary winding of hybrid coil 82 in network 102 are terminated by resistances 75 and 85, respectively. Similarly, the center tap of hybrid coil 71 is terminated by resistance 73 and the center tap of hybrid coil 81 is terminated by a resistance 84. The left, or West, end of the repeater is connected to center tap of hybrid coil 70 in network 101 and the right, or East, end of the repeater is connected to the center tap of hybrid coil 80 in network 102. The circuit operates as follows:

High frequency signals entering at the left, or West, terminal split in hybrid coil 70, are reflected out of phase by filters 78 and 79 and pass to hybrid coil 71. Here they again split and pass through high pass filters 76 and 77 to hybrid coil 72. They pass to the secondary winding of hybrid 72 and thence to amplifier 90. The amplified signal is introduced into hybrid coil 83, splits into two equal portions which pass through filters 88 and 89 and re-combine in hybrid coil 81. The signal passes to hybrid coil 80, again splits and the portions are reflected out of phase by filters 86 and 87. The reflected portions combine in hybrid 80 and pass out to the right hand, or East, terminal 92 of the repeater.

Similarly, signals entering from the right hand terminal 92 are split, pass through various filters and reflected by others, and combine to be amplified and pass out the left hand terminal 91 of the repeater. The four resistances 74, 75, 84 and 85, one in each branching network, can be adjusted to balance out small discrepancies in the transmission characteristics of the networks.

While the repeater configuration shown in Fig. 7 is more complex than the others heretofore shown, it has the added advantage of including both a pair of high pass filters and a pair of low pass filters in each of the feedback loops. The loop loss for both the low frequnecy and the high frequency components may therefore be made large simply by designing the filters to have moderate losses in their respective stop bands. These requirements, however, are considerably easier to meet in a balanced system than if relying on loop loss alone.

Figure 8:
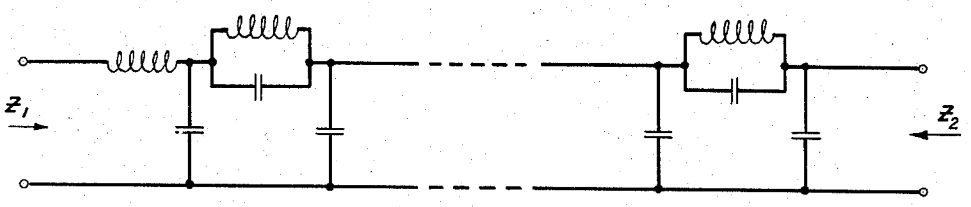
Fig. 8 shows an antimetric filter suitable for use in place of the inverse filters shown in Figs. 3A and 3B.

Another means of simplifying the filter construction for repeaters such as those described above is to use antimetric filters such as that shown in Fig. 8. An antimetric filter is a filter having input and output impedances which are inversely related to each other. In Fig. 8 this means that the input impedance $Z_1$ is equal to a constant $R^2$ divided by the output impedance $Z_2$. It can be seen that this is the same relationship that exists between the input impedances of mutual inverse filters. Antimetric filters such as that shown in Fig. 8 may therefore be used in the repeater configurations shown in Figs. 2, 5, 6 and 7 merely by facing the opposite end of the filter toward the hybrid to obtain its inverse characteristic. Since all of the filters involve the identically same physical structure, their transmission characteristics can be made to bear a high degree of similarity.

In all cases, it is understood that the above-described arrangements are simply illustrative of a small number of the many possible specific embodiments which can represent applications of principles of the invention. Numerous and varied other arrangements can readily be devised in accordance with these principles by those skilled in the art without departing from the spirit and scope of the invention.

What is claimed is:

1. In a carrier wave transmission system having different frequency channels for opposite directions of transmission, at least a first and second hybrid branching circuit each having two pairs of ports, the ports of each pair of each of said branching circuits being effectively exclusively connected together for signal frequencies within a given frequency band and each port of one pair of each of said branching circuits being effectively exclusively connected to one port of the other pair of said each one of said branching circuits for signal frequencies outside said band, said given frequency band being substantially the same in said first and second branching circuits, one port of said first branching circuit being connected to receive and transmit intelligence-bearing signals from and toward one direction, one port of said second branching circuit being connected to receive and transmit intelligence-bearing signals from and toward the other direction, means for amplifying said intelligence-bearing signals connected between the paired port of said one port of said first branching circuit and the paired port of said one port of said second branching circuit, and means for coupling each port of the other pair in said first branching circuit to one port of said other pair in said second branching circuit.

2. A bilateral repeater for carrier wave transmission systems comprising at least four hybrid means each having a first and a second pair of mutually conjugate transmission paths, filtering means connecting one path of said first pair of each of two of said hybrid means with one path of said first pair of one of the other two of said hybrid means, inverse filtering means connecting the other path of said first pair of each of said two hybrid means with the other path of said first pair of the connected one of said other two hybrid means, coupling means connecting one path of said second pair of each of said hybrid means with one path of said second pair of another of said hybrid means, amplifying means connecting the other path of said second pair of one of said hybrid means with the other path of said second pair of another of said hybrid means, input means connected to one of the remaining paths of said second pair of one of said hybrid means, and output means connected to the other of the remaining paths of said second pair of another of said hybrid means.

3. A carrier wave signal transmission system for simultaneously transmitting a first signal channel in one direction in a transmission medium and a second signal channel in the other direction in said transmission medium, said transmission system comprising a plurality of constant resistance hybrid branching circuits each having two pairs of terminal sets, the terminal sets of each of said pairs being effectively connected together for said first signal channel and each terminal set of one of said two pairs being effectively connected to one terminal set of the other of said pairs for said second signal channel, one terminal set of one circuit being adapted to receive and transmit signals in said first channel and one terminal set of another circuit being adapted to receive and transmit signals in said second channel, amplifying means connecting the paired terminal set of said one terminal set of said one circuit to the paired terminal set of said one terminal set of said other circuit, and coupling means connecting each terminal set of the remaining pair in said one circuit with one terminal set of the remaining pair in said other circuit.

4. The carrier wave signal transmission system according to claim 3 in which each of the connections to said amplifying means includes paired terminal sets of third and fourth ones of said constant resistance hybrid branching circuits.

5. The carrier wave signal transmission system according to claim 3 in which the other terminal set of the remaining pair in each of said circuits is connected to other terminal set of the remaining pair in said other of said circuits.

6. A bilateral repeater for carrier wave transmission systems comprising a pair of frequency branching networks having four sets of terminals, each of said networks presenting constant resistance to all of said sets of terminals for all frequencies and providing transmission between a first and a second set and between a third and a fourth set for frequency components within a given pass band and providing transmission between said first and said third set and between said second and said fourth set for frequency components outside of said given pass band, coupling means connecting said third set of one of said networks with said third set of the other of said networks and connecting said fourth set of said one network with said fourth set of said other network, first input and output means connected to said first set of said one network, second input and output means connected to said second set of said other network, and unilateral amplifying means connecting said first set of said other network and said second set of said one network.

7. In a two-wire carrier wave transmission system using different frequency channels for opposite directions of transmission, at least a first and a second hybrid branching circuit each comprising two hybrid coils having each terminal set of one conjugate pair connected to the corresponding terminal set of one conjugate pair of the other hybrid coil by means of a first and a second filter, respectively, said first filter providing an input impedance inversely related to the input impedance of said second filter, one terminal set of the other conjugate pair of one hybrid coil in said first circuit being connected to receive and transmit intelligence-bearing signals from and toward one direction, one terminal set of the other conjugate pair of one hybrid coil in said second circuit being connected to receive and transmit intelligence-bearing signals from and toward the other direction, means for amplifying said intelligence-bearing signals connected from the corresponding one terminal set of the other conjugate pair of the other hybrid coil in said second circuit to the corresponding one terminal set of the other conjugate pair of the other hybrid coil in said first circuit, and means for coupling each of the paired terminal sets of said one terminal set of said other conjugate pair in said first circuit to a corresponding one of the paired terminal sets of said one terminal set of said other conjugate pair in said second circuit.

8. A bilateral repeater for two-wire carrier wave transmission systems comprising at least four hybrid coils each having a first and a second pair of mutually conjugate winding connections, filtering means connecting one winding connection of said first pair of each of two of said coils with a corresponding one of said first pair of the other two of said coils, filtering means inverse to said first-mentioned filtering means connecting the other winding connection of said first pair of each of said two coils with the corresponding other winding connection of said first pair of said other two coils, coupling means connecting one winding connection of said second pair of each of said coils with a corresponding one of said second pair of another of said coils, amplifying means connecting the other winding connection of said second pair of one of said coils with the other winding connection of said second pair of another of said coils, first input and output means connected to one of the remaining winding connections of said second pair of one of said coils, and second input and output means connected to one of the remaining winding connections of said second pair of another of said coils.

9. In a carrier wave transmission system having different frequency channels for opposite directions of transmission, a bilateral repeater comprising four hybrid coils each having two pairs of mutually conjugate winding connections, a filter connecting one winding connection of one pair of the first and third coils and a substantially identical filter connecting one winding connection of one pair of the second and fourth coils, a filter inverse with respect to said first-mentioned filter connecting the other winding connection of said one pair of said first and third coils and a substantially identical inverse filter connecting the other winding connection of said one pair of said second and fourth coils, coupling means connecting one winding connection of the other pair of said first and second coils and coupling means connecting one winding connection of the other pair of said third and fourth coils, first input and output means connected to the other winding connection of the other pair of said first coil, second input and output means connected to the other winding connection of the other pair of said fourth coil, and a unilateral amplifier connecting the other winding connection of the other pair of said second and third coils.

10. The bilateral repeater according to claim 9 in which said hybrid coils are coupled in a bridged-T relationship to each other with said filters in the bridging and shunt arms.

11. The bilateral repeater according to claim 9 in which said hybrid coils are coupled in a bridged-T relationship to each other with said filters in the series arms.

12. In combination with a pair of transmission line sections, a two-way carrier repeater comprising a unilateral amplifier having an input circuit and an output circuit, first and a second wave transmission networks of the bridged-T type serially connected between a first of said line sections and said amplifier input circuit, third and a fourth wave transmission networks of the bridged-T type serially connected between the second of said line sections and said amplifier output circuit, each of said transmission networks comprising a bridging impedance branch and a shunt impedance branch, a first filter circuit connected between said bridging impedance branch of said first and third transmission networks, a second filter circuit substantially identical to said first filter circuit connected between said bridging impedance branch of said second and fourth transmission networks, a third filter circuit of inverse structure with respect to said first and second filter circuits connected between said shunt impedance branch of said first and third transmission networks, and a fourth filter circuit substantially identical to said third filter circuit connected between said shunt impedance branch of said second and fourth transmission networks, all of said filter circuits having the same pass band.

13. An equivalent four-wire repeater for carrier wave transmission systems comprising a first and a second transformer each having identical primary and secondary windings, a filter circuit connected between one end of the primary winding of each of said transformers and one end of the secondary winding of the other of said transformers, a filter circuit having an inverse structure with respect to said first-mentioned filter circuit connected between the other end of said primary windings of each of said transformers and the other end of said secondary windings of the other of said transformers, and a unilateral amplifier connected between the center tap of said secondary winding of said one transformer and the center tap of said secondary winding of said other transformer, the center taps of both of said primary windings being adapted to receive and transmit signals from and toward both directions.

14. An equivalent four-wire repeater according to claim 13 in which said filter circuits are of the low pass type.

15. An equivalent four-wire repeater according to claim 13 in which said filter circuits are of the high pass type.

16. An equivalent four-wire repeater according to claim 13 in which said filter circuits are of the band pass type.

17. An equivalent four-wire repeater according to claim 13 in which said filter circuits are of the antimetric type.

18. In a carrier wave transmission system having different frequency channels for opposite directions of transmission, a bilateral repeater comprising two transformers each having two substantially identical windings, the ends of each winding of one transformer being connected respectively to the corresponding ends of each winding of the other transformer by mutually inverse filter circuits having the same pass band and presenting inverse input impedances outside said band, and amplifying means connected between the center tap of one winding of said one transformer and the center tap of the corresponding other winding of said other transformer, the center taps of the remaining windings being adapted to receive and transmit said carrier waves.

19. An equivalent four-wire repeater for bilateral carrier wave transmission systems comprising first and second constant resistance frequency branching networks, each of said branching networks comprising two hybrid means each having two pairs of mutually conjugate energy transfer paths, filter means connected between one path of one pair of one of said hybrid means and one path of one pair of the other of said hybrid means and inverse filter means connected between the other path of said one pair of said one hybrid means and the other path of said one pair of said other hybrid means, input and output means connected to one path of the other pair of said one hybrid means of said first network, input and output means connected to one path of the other pair of said one hybrid means of said second network, means connecting the other path of said other pair of said one hybrid means of said first network and one path of the other pair of said other hybrid means of said second network, means connecting the other path of said other pair of said one hybrid means of said second network and one path of the other pair of said other hybrid means of said first network, and unilateral amplifying means connected between the other path of said other pair of said other hybrid means of said first network and the other path of said other pair of said other hybrid means of said second network.

20. An equivalent four-wire repeater for bilateral carrier wave transmission systems comprising a first, a second, a third and a fourth transformer each having a primary and a secondary winding, a low pass filter connected between one end of the primary winding of each of said first and second transformers and one end of the primary winding of said third and fourth transformers, respectively, an inverse low pass filter connected between the other end of the primary winding of each of said first and second transformers and the other end of the primary winding of said third and fourth transformers, respectively, a fifth and a sixth transformer each having a primary and a secondary winding, a high pass filter connected between one end of the secondary winding of each of said first and second transformers and one end of the primary winding of said fifth and sixth transformers, respectively, an inverse high pass filter connected between the other end of the secondary winding of each of said first and second transformers and the other end of the primary winding of said fifth and sixth transformers, respectively, a center-tap on the primary winding of each of said first and second transformers being adapted to receive and transmit said carrier waves, means connecting a center-tap on the primary winding of said third transformer to a center tap on the primary winding of said sixth transformer, means connecting a center tap on the primary winding of said fourth transformer and a central tap on the primary winding of said fifth transformer, and unilateral amplifying means connected between the secondary winding of said fifth transformer and the secondary winding of said sixth transformer.

References Cited in the file of this patent

UNITED STATES PATENTS

| | | |
|---|---|---|
| 2,531,419 | Fox | Nov. 28, 1950 |
| 2,561,212 | Lewis | July 17, 1951 |